United States Patent
Wyatt (10) Patent No.: US 6,710,958 B2
(45) Date of Patent: Mar. 23, 2004

(54) OPTIMIZED SPARING TABLE AND METHOD

(75) Inventor: Stewart R. Wyatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 10/054,626

(22) Filed: Oct. 26, 2001

(65) Prior Publication Data

US 2003/0090827 A1 May 15, 2003

(51) Int. Cl.[7] .................................................. G11B 5/09
(52) U.S. Cl. .......................... 360/53; 714/762; 714/710; 714/8
(58) Field of Search .......................... 360/53; 714/787, 714/788, 761, 762, 710, 711, 769, 770, 8

(56) References Cited

U.S. PATENT DOCUMENTS

| | | |
|---|---|---|
| 5,523,903 A | 6/1996 | Hetzler et al. |
| 5,559,958 A | 9/1996 | Farrand et al. |
| 5,579,475 A | 11/1996 | Blaum et al. |
| 5,666,512 A | 9/1997 | Nelson et al. |
| 5,768,044 A | 6/1998 | Hetzler et al. |
| 5,822,142 A | 10/1998 | Hicken |
| 5,937,435 A | 8/1999 | Dobbek et al. |
| 6,101,619 A | 8/2000 | Shin |
| 6,189,110 B1 | 2/2001 | Saitoh et al. |
| 6,212,647 B1 | 4/2001 | Sims, III et al. |
| 6,223,303 B1 | 4/2001 | Billings et al. |
| 6,239,931 B1 | 5/2001 | Chung et al. |

Primary Examiner—Alan T. Faber

(57) ABSTRACT

Methods and systems for providing sparing tables are described. In one embodiment, at least one media for storing data is received and processed. Processing takes place by identifying burst errors having burst error locations. A determination is made as to whether any of the burst errors can be combined for purposes of entry annotation in a sparing table associated with the media. A sparing table is then configured with entries associated with the burst errors. In an event that a burst error can be combined with at least one other burst error, an entry is provided in the sparing table that reflects one or more burst error combinations.

21 Claims, 6 Drawing Sheets

100 ⟶

⟶ 102a

Sparing Table - Media 1

⟶ 104a

Sparing Table - Media 2

⟶ 106a 108

Sparing Table - Media 3

| Physical Address 602 | Length 604 |
|---|---|
| Combined_Address_1 | 10 |
| Single Address | 3 |
| Combined_Address_2 | 30 |
|  |  |

Sparing Table

*Fig. 6*

OPTIMIZED SPARING TABLE AND METHOD

TECHNICAL FIELD

This invention relates generally to data storage systems, and in particular, to systems and methods for providing media defect management.

BACKGROUND

Data storage systems such as bulk storage media (e.g. magnetic and optical storage media) and semiconductor devices, often include defects which arise during manufacturing, such as inconsistencies in a magnetic or optical coating or other surface or substrate anomalies, which make portions of the media unsuitable for data storage. However, it is often desirable to use media containing such defects, as these defective areas are generally relatively small compared to the total storage area of the media. Therefore, schemes for identifying and avoiding these defective areas have been used in the past.

Traditional schemes for defect management have, in the past, been complex and inflexible. According to one scheme, data is broken into "blocks" which are then encoded with a redundant error correction code (ECC). The original data and a redundant parity are both stored in the storage device. When the data is recovered, an ECC decoder uses the redundancy to identify and correct data errors. Any chosen error correction code, however, has limits and, if too many errors occur, data corruption will occur that the decoder may or may not detect.

Another scheme that has been utilized, often in conjunction with an ECC scheme, is referred to as "sparing". Sparing schemes typically, although not always, rely on utilizing a portion of the media as a defect management area in order to present a media that, although including defective areas, appears as if it were defect free. Accordingly, upon a manufacturer's formatting of the media for subsequent use in data storage, an analysis of the storage areas is made and defective areas are marked as unusable. In order to provide media which includes a particular amount of available user storage area, logical addresses of the user data areas can be "slipped" into the defect management area so as to omit the physical addresses of these defective areas and, thus, present defect free logical media.

A common way to implement a sparing strategy is to have a set of replacement blocks at the high end of the physical address. When a request is made for a given block, the controller checks a "spare" table to determine if that particular location has been spared (i.e. identified as a location that has a physical defect and is hence unusable). If the location has been spared, the table provides an alternate address among the replacement blocks.

Many storage systems incorporate both ECC and sparing. One strategy is to identify "blocks" that have so many errors as to prevent them from being corrected by the chosen ECC, and spare those blocks while not sparing blocks with errors that are within the correction capability of the ECC.

A resource-limited controller implies that the spare table may not be as large as might be desired for some cases that may occur. The location of spares is typically influenced by the manufacturing process and how manufacturing defects affect the functionality of the storage device. Some devices are prone to a burst of varying length of serially occurring errors, while others are prone to randomly distributed errors.

As an example of a burst error, consider a scratch that might propagate some distance across the surface of a hard disk, or a crystalline anomaly that propagates linearly through the crystalline structure of a semiconductor device.

In the past, it has become a common practice to predefine a spare table to have a fixed, non-varying size. When a particular media is initially tested and burst errors are detected, table entries are made in this spare table to provide data that can be used to map affected physical addresses to other valid or non-defective physical address locations. As an example, consider FIG. 1.

Figure 1:
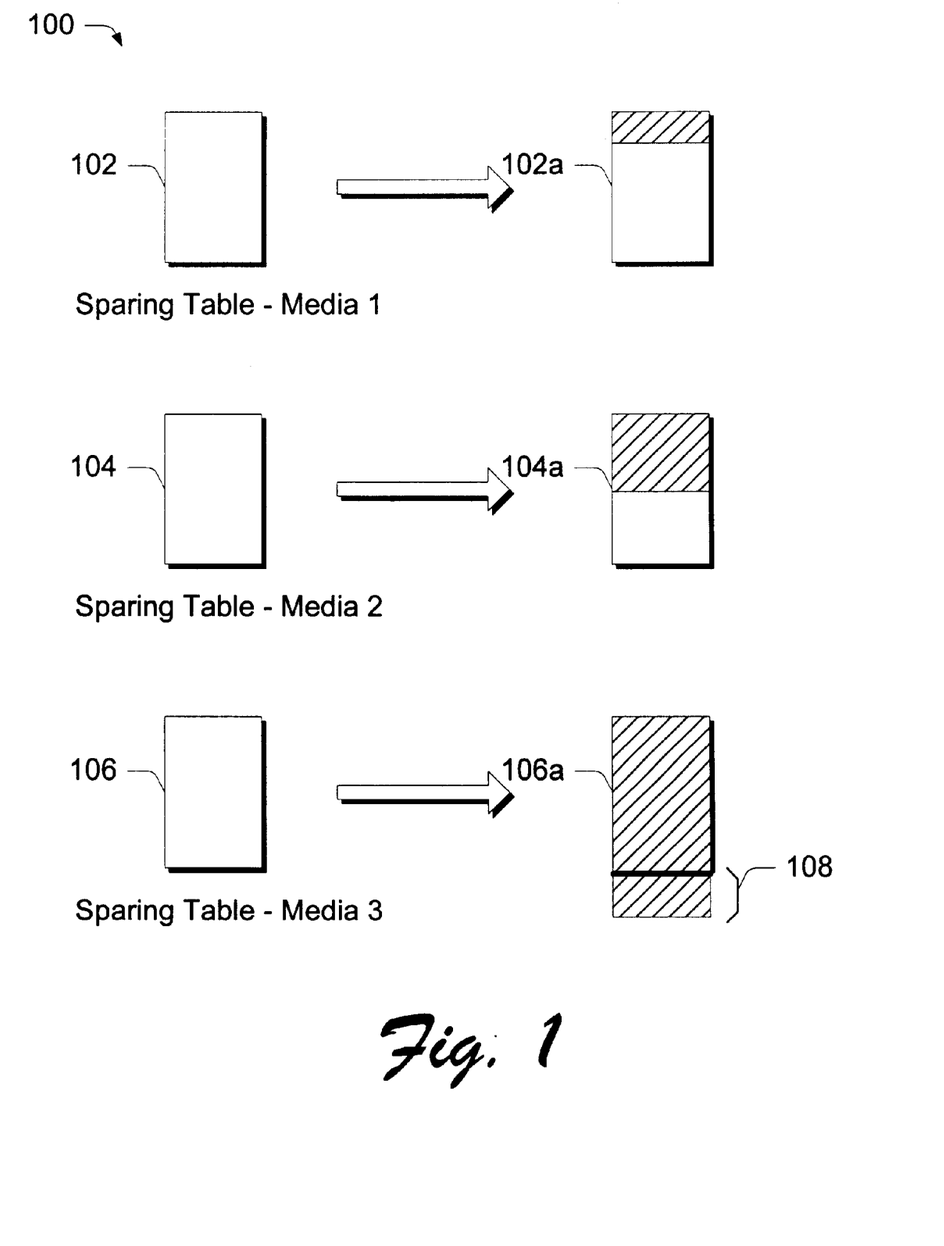
FIG. 1 is a diagram that illustrates multiple different sparing tables in accordance with the prior art.

There, a sparing table collection 100 is shown and includes individual sparing tables 102 (associated with Media 1), 104 (associated with Media 2), and 106 (associated with Media 3). Each of Media 1–3 comprise the same media type, e.g. a hard disk. Notice that each of the sparing tables 102–106 is the same, fixed size. That is, as between media of the same media type, the size of the sparing tables does not vary. Now consider what happens when each media is tested after manufacture to ascertain whether there are any burst errors and their locations. This is diagrammatically represented to right of each of sparing tables 102–106 where the respective sparing tables are shown at 102a–106a in relation to the data that each would contain to represent its burst errors. For the case of Media 1, sparing table 102a includes a cross-hatched portion that represents a quanta of data that is associated with its burst errors. In this example, Media 1 may contain one burst error. In this case, the quanta of data does not fill the sparing table to capacity. Accordingly, Media 1 is deemed to be within acceptable limits. For the case of Media 2, sparing table 104a includes a quanta of data (indicated by the cross-hatching) that does not exceed the capacity of the sparing table. In this example, Media 2 may contain 3 burst errors. However, for the case of Media 3, sparing table 106a would have to include a quanta of data (indicated at 108) that exceeds its fixed capacity (e.g. perhaps Media 3 has four burst errors). Accordingly, Media 3 would be deemed to exceed acceptable limits and would be discarded.

There are instances, however, when the number of burst errors in a particular media is such that the capacity of a fixed-size sparing table is exceeded, but the media would still be useful and desirable to use for storage. Yet, using the standard set forth above, such media exceptions will always be discarded as defective.

For additional information on sparing, the reader is referred to the following references: U.S. Pat. Nos. 6,212,647, 5,666,512, 5,937,435, 5,822,142, and 6,223,303.

Accordingly, this invention arose out of concerns associated with providing improved or optimized sparing tables and methods that can effectively increase yields.

SUMMARY

Methods and systems for providing sparing tables are described. In one embodiment, at least one media for storing data is received and processed. Processing takes place by identifying burst errors having burst error locations. A determination is made as to whether any of the burst errors can be combined for purposes of entry annotation in a sparing table associated with the media. A sparing table is then configured with entries associated with the burst errors. In an event that a burst error can be combined with at least one other burst error, an entry is provided in the sparing table that reflects one or more burst error combinations.

DETAILED DESCRIPTION

Overview

In the embodiments described below, a media processor is provided and implements a method in which individual media are tested for burst errors. The media processor can be provided during manufacturing testing of the media, or within a media product to be used during memory management operations such as media formatting and the like. One or more parameters associated with identified burst errors are analyzed to ascertain whether table entries in a sparing table can be optimized. If the analysis indicates that sparing table entries can be optimized for a individual media, then the sparing table is configured to optimize its entries. The result of this analysis and processing is that media yields can improve.

Exemplary System

Figure 2:
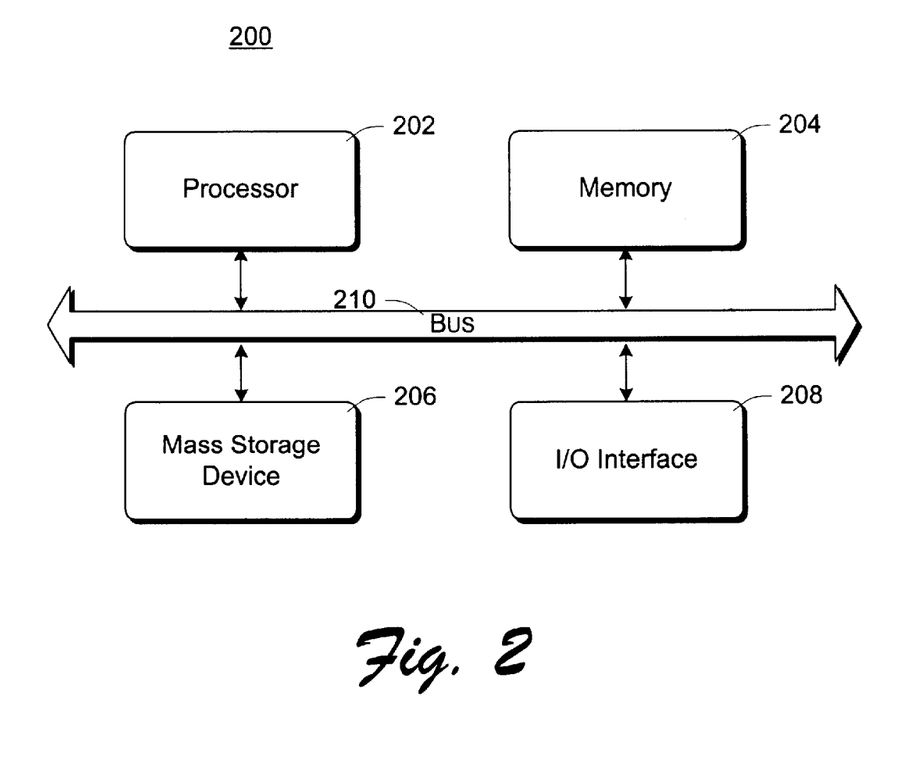
FIG. 2 is a block diagram that illustrates various components of a computer system in which one or more embodiments can be implemented.

FIG. 2 illustrates an exemplary computer system 200 that can be used to implement a media processor as described above and below. Computer system 200 represents a wide variety of computing devices, such as desktop computers, portable computers, dedicated server computers, multi-processor computing devices, microcontroller-based electronic devices, and so forth.

Computer system 200 includes one or more processors 202, memory 204, a mass storage device 206, and an input/output (I/O) interface 208, all coupled to a bus 210. Bus 210 represents one or more buses in computer system 200, such as a system bus, processor bus, accelerated graphics port (AGP), peripheral component interconnect (PCI), and so forth. The bus architecture can vary by computing device as well as by manufacturer. I/O interface 208 is a conventional interface allowing components of system 200 (e.g., processor(s) 202) to communicate with other computing devices via a network. I/O interface 208 may be, for example, a modem, a network interface card (NIC), and so forth.

Memory 204 represents volatile and/or nonvolatile memory used to store instructions and data for use by processor 202. Typically, instructions are stored on a mass storage device 206 (or nonvolatile memory) and loaded into a volatile memory 204 for execution by processor(s) 202. Additional memory components may also be involved, such as cache memories internal or external to processor 202. Various embodiments can be implemented, at different times, in any of a variety of computer readable media that is part of, or readable by, system 200. For example, such computer readable media may be mass storage device 206, memory 204 or a cache memory, a removable disk (not shown) that is accessible by processor 202 or another controller of system 200 (such as a magnet disk or optical disk), and so forth.

Computer system 200 is exemplary only. It is to be appreciated that additional components (not shown) can be included in system 200 and some components illustrated in system 200 need not be included. For example, a display adapter, additional processors or storage devices, additional I/O interfaces, and so forth may be included in system 200, or mass storage device 206 may not be included.

I/O interface 208 is a conventional interface allowing components of system 200 (e.g., processor 202) to communicate with other computing devices via a network.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

In the illustrated and described embodiment, computer system 200 can comprise a system that is used by a media manufacturer during the initial testing phase of the media after its manufacture.

Exemplary Embodiment

Figure 3:
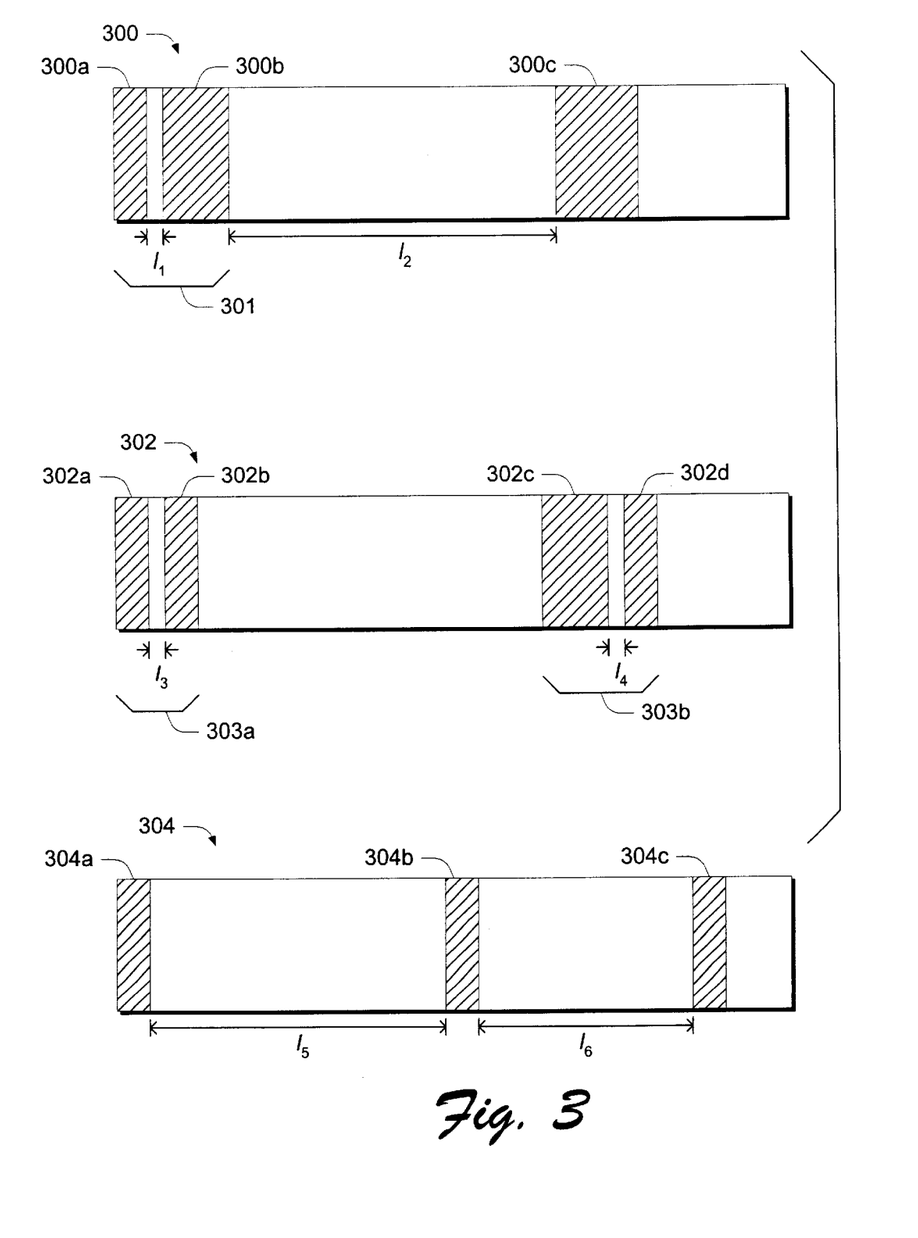
FIG. 3 is a diagram that illustrates three individual media of the same type, and is useful for understanding at least one inventive embodiment.

FIG. 3 diagrammatically illustrates one inventive concept in accordance with the described embodiment. Three different media are illustrated at 300, 302, and 304. Each of the illustrated media are the same media type. For purposes of this illustration, consider that the media comprise magnetic storage media such as a hard disk. Illustrated in cross-hatching for each of the media are burst errors. Recall that burst errors, as opposed to random errors, have a sequential nature. Thus, media 300 has three burst errors depicted at 300a, 300b, and 300c respectively. Similarly, media 302 has four burst errors depicted at 302a, 302b, 302c, and 302d respectively. Likewise, media 304 has three burst errors depicted at 304a, 304b, and 304c respectively.

In accordance with one embodiment, the locations of the defects giving rise to the burst errors are determined for each media. Then, a determination is made in light of a tradeoff between the number of burst errors that are to be spared (i.e. noted in a sparing table for that media) and the length of the spared burst errors. If the determination is favorable, then two or more burst errors can be combined for purposes of annotation in the sparing table. If the determination is unfavorable, then the burst errors are not combined for purposes of annotation in the sparing table (i.e. each of the burst errors is the subject of the separate entry in the sparing table, if the size of the sparing table permits).

As an example, consider further FIG. 3. Notice that length parameters are indicated below each of the media (i.e. $l_1$, $l_2$, and so forth). The length parameters correspond to the length between each burst error. So, for media 300, $l_1$ indicates the length between burst errors 300a and 300b. Similarly, $l_2$ indicates the length between burst errors 300b and 300c. Normally, because three burst errors exist on media 300, three separate entries in the media's sparing table would be made. In this case, however, such need not be the case. Specifically, notice that the distance $l_1$ is fairly short. Accordingly, for purposes of entry annotation in the media's sparing table, burst errors 300a and 300b can be combined. Thus, only one entry need be made in the media's sparing table to account for the two burst errors. Accordingly, all of the physical addresses that correspond to the media portions within burst errors 300a and 300b, as well as the media portion between the two burst errors, will be spared. This area is indicated at 301. Consider now burst errors 300b and 300c. Notice now that the distance between them ($l_2$) is fairly large. In this case, the two burst errors would not be combined for purposes of entry annotation in the media's sparing table. This is because doing so would necessarily result in sparing too much good media (i.e. that which corresponds to the length $l_2$) disposed between the two burst errors.

As further examples, consider media 302 and 304. Notice that media 302 has four burst errors. Normally, this would result in four separate entries in the media's sparing table. Notice, however, that lengths $l_3$ and $l_4$ are such that the burst errors between which each occurs can be combined for purposes of entry annotation in the media's sparing table. Accordingly, one of the entries in the media's sparing table would correspond to burst errors 302a, 302b and the media therebetween, and one of the entries would correspond to burst errors 302c, 302d and the media therebetween. Hence, whereas in the past four separate sparing table entries would be needed to account for burst errors 302a–302d, now only two are needed. The media areas corresponding to these two entries are shown respectively at 303a, 303b.

Consider now media 304. Notice that all of the burst errors have a sufficient distance between them that combining them for purposes of entry annotation in the media's sparing table would be inefficient. Accordingly, the sparing table for media 304 would contain three entries each of which correspond to an individual burst error.

Exemplary Media Processor

Figure 4:
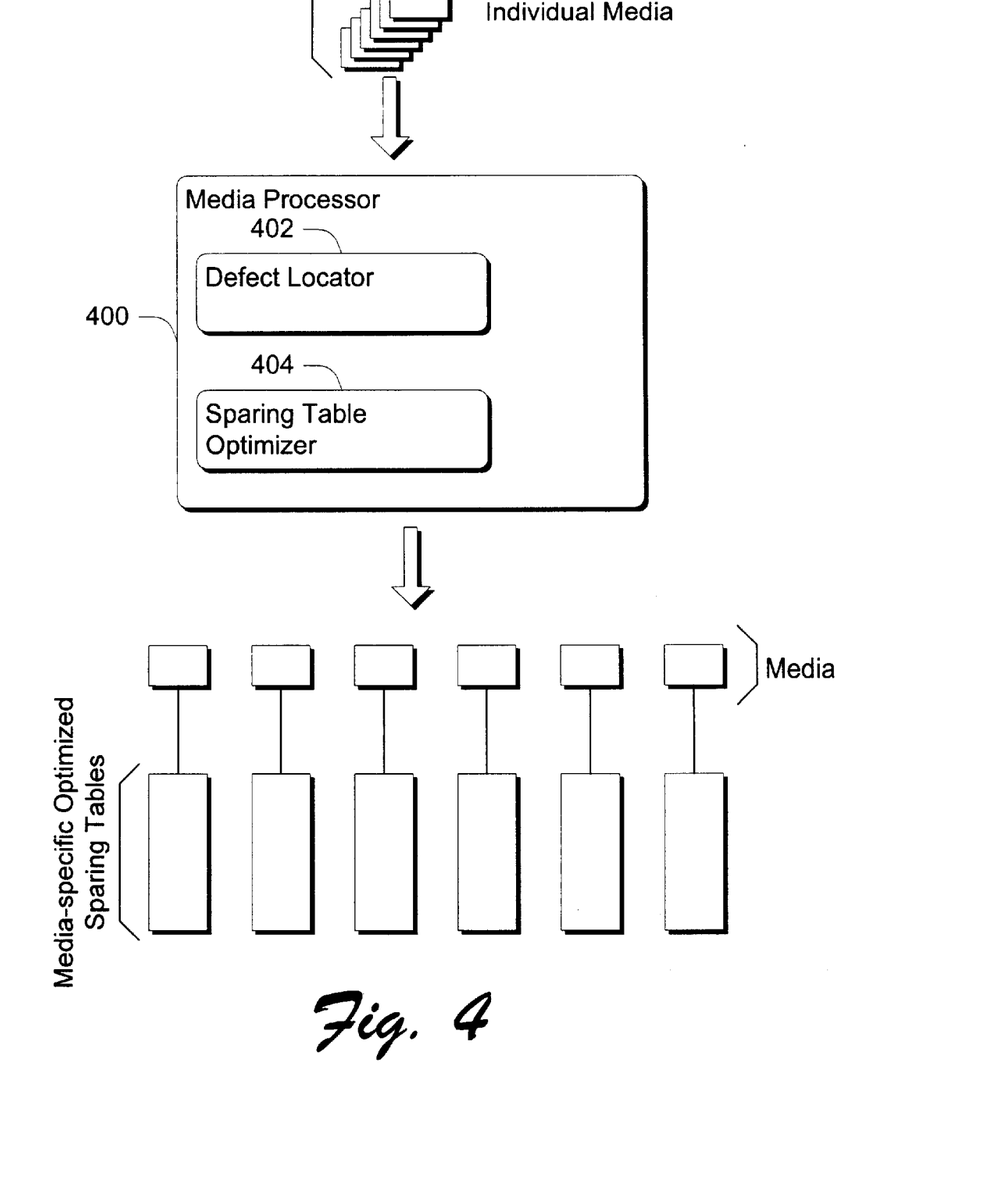
FIG. 4 is a block diagram that illustrates an exemplary media processor in accordance with one embodiment.

FIG. 4 shows an exemplary media processor 400 that is configured to process one or more different media types. Media processor 400 is typically used in connection with the manufacturing process through which the various media are manufactured. Media processor can be implemented in any suitable hardware, software, firmware, or combination thereof. Media processor 400 includes, in this example, a defect locator 402 and a sparing table optimizer 404. As the individual media are received by the media processor 400, defect locator 402 processes the media to identify defect locations. This process desirably identifies locations corresponding to burst errors. Any suitable method of detecting defect locations can be used, as will be appreciated by those of skill in the art. For example, in some media, during an initial formatting step after the media has been manufactured, test data can be written into the media. The test data can then be read and checked to ascertain whether any data corruption has occurred. As media types can certainly vary, so too can the methods and approaches used to locate defects within the media.

When the defect locations have been identified, sparing table optimizer 404 is programmed to calculate or otherwise determine whether any of the burst errors can be combined for purposes of entry annotation in a sparing table that is associated with the media. The sparing table optimizer 404 can be programmed to consider any suitable parameters that can help it to more optimally configure the sparing table. In the FIG. 3 example, one of the parameters that is considered is the physical distance between burst error locations. In this regard, the sparing table optimizer can be programmed to optimally combine burst error locations when the distance between them is not too great. This approach recognizes that there is a tradeoff between the number of burst error locations that are spared and the length of the spared burst errors.

As an example, consider again FIG. 3 and, specifically, media 304 which has three burst errors. Here, without combining any of the burst errors for purposes of entry annotation in the sparing table, there will be three entries. Additionally, the amount of real estate spared by these three entries is relatively small as compared with the overall size of the media. Now, if one were to combine, say, burst errors 304a and 304b, then all of the real estate associated with not only the burst errors, but that disposed between the burst errors would be spared. In this case, there would only be two entries in the sparing table (which is good from the standpoint of conserving sparing table resources). The tradeoff, however, is that the amount of non-defective media that is spared is much larger compared to the overall size of the media. Accordingly, in this example, the sparing table optimizer 404 would likely decide that separate sparing table entries would be used for media 304.

Continuing, after the sparing table optimizer has determined an optimal combination of burst errors for purposes of entry annotations in the sparing table, media processor 400 can then configure the sparing table for the particular media. In FIG. 4, this is represented just below media processor 400 where each piece of media is shown in association with its media-specific, optimized sparing table.

Exemplary Method

Figure 5:
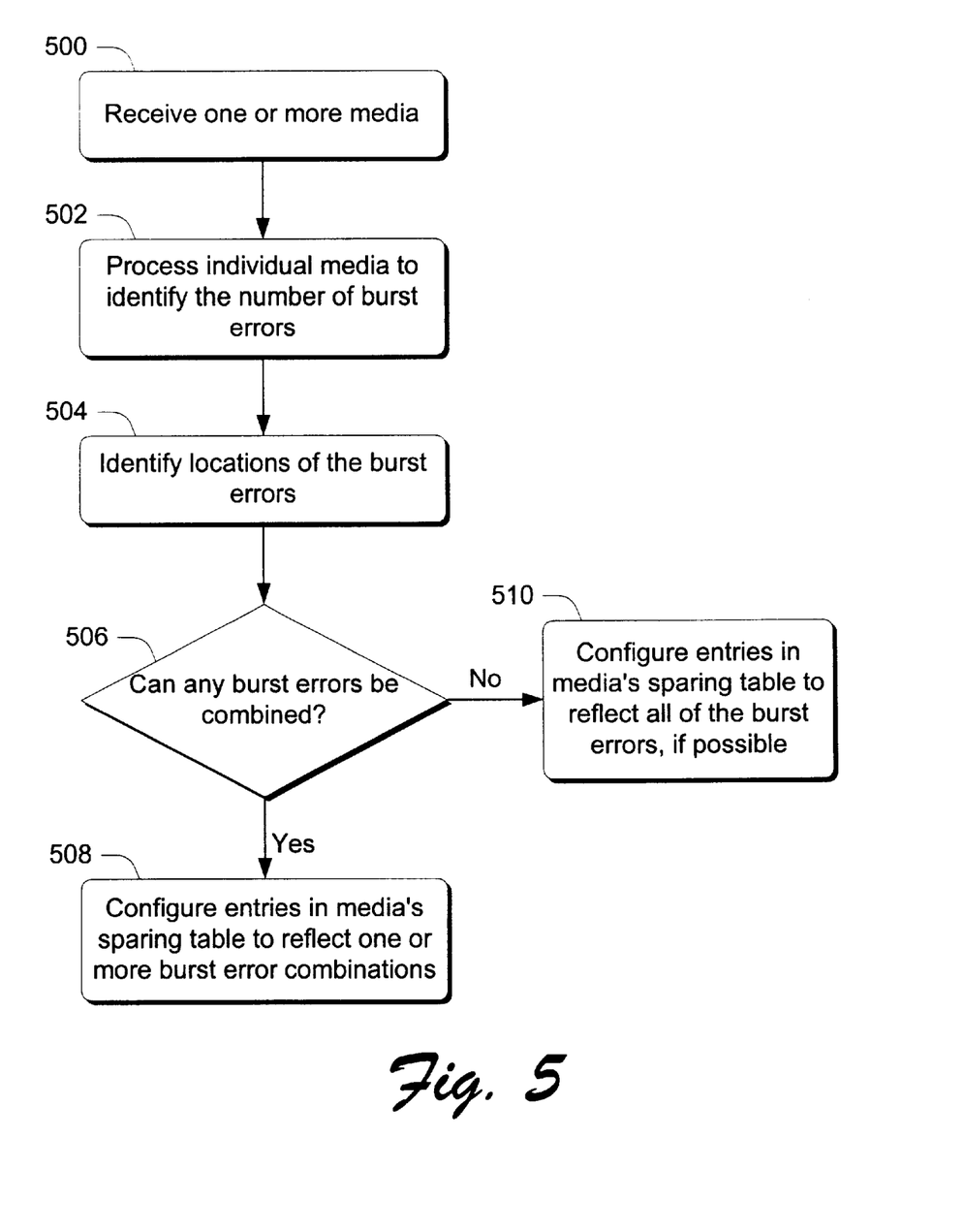
FIG. 5 is a flow diagram that illustrates steps in a method in accordance with one embodiment.

FIG. 5 shows a flow diagram that illustrates steps in a method in accordance with one embodiment. The steps can be implemented in any suitable hardware, software, firmware, or combination thereof. For example, the steps can be implemented in connection with a media processor 400, such as the one shown and described in FIG. 4.

Step 500 receives one or more media. This step can be implemented in connection with any suitable media upon which data is stored. Examples can include, without limitation, various types of magnetic-based, optical-based, and/or semiconductor-based media. Step 502 processes individual media to identify the number of burst errors that the media contains. This step can be implemented in any suitable way. Such ways can vary with the different types of media that can be processed. Step 504 identifies the locations of the burst errors. Again, this step can be implemented in any suitable way. Step 506 determines whether any of the burst errors can be combined for purposes of entry annotation in a sparing table associated with the media. This step can be implemented utilizing one or more optimization algorithms. The optimization algorithm(s) can consider any suitable parameters that can assist in more efficiently configuring the sparing table. One exemplary parameter in the form of a physical distance between burst error locations was described above. Other parameters can, of course, be utilized without departing from the spirit and scope of the claimed subject matter.

If step 506 determines that any of the burst errors can be combined, then step 508 configures entries in the media's sparing table to reflect one or more of the burst error combinations. If, on the other hand, step 506 determines that none of the burst errors can be combined, then step 510 configures entries in the media's sparing table to reflect all of the burst errors (if possible). Recall that the media can contain more burst errors than would be accommodated in the sparing table. If this is the case, then the media would likely be discarded as defective.

Exemplary Sparing Table

Figure 6:
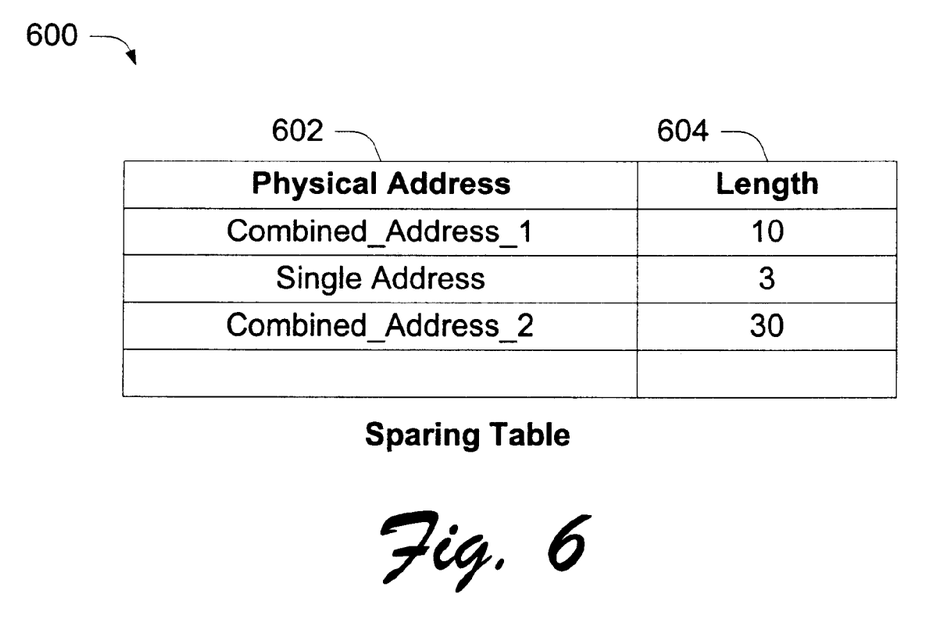
FIG. 6 is a diagram of an exemplary sparing table.

FIG. 6 shows an exemplary sparing table 600 that can be configured in accordance with the above-described embodiments. In this example, sparing table 600 has a field 602 that contains data associated with the starting physical address of a media portion that has been spared due to burst errors. A "length" field contains data that defines the length of the address string that is spared, starting at the address in the "physical address" field. The sparing table 600 can reside on the same physical media which is the subject of the sparing operation, or it can comprise part of a non-volatile memory of a memory controller associated with the media.

In this particular sparing table there are three entries. The first entry is designated "Combined_Address_1" and represents data that defines the starting physical address of a string of physical addresses that have been spared. The significance of the "Combined" designation is that the address represents two or more burst errors that have been combined. The second entry in table 600 is designated "Single Address" and represents data that defines the starting physical address of a string of physical addresses that have been spared on account of a single burst error. The third table entry is designated "Combined_Address_2" and represents data that defines the starting physical address of a string of physical addresses that have been spared. This address is the starting address of a string of physical address that have been combined on account of multiple burst errors.

As an example of the extent to which the sparing table resources can be conserved using the described approach, consider the following. Assume that a particular media has several burst errors that are very closely spaced. In the past, each of the individual burst errors would be the subject of a separate entry in the sparing table. If there were ten such burst errors, then ten separate entries would be made. If, however, the nature of the burst errors lends itself to combination for purposes of sparing table entries, then conceivably only one entry would need to be made in the sparing table to account for all of the spared addresses. In this example, this represents an order of magnitude in terms of sparing table efficiency.

Other Sparing Table Optimizations

In the discussion above, optimization techniques are described that optimize the actual spares or spare entries of the spare table. It is to be appreciated and understood that other optimization techniques can be utilized. For example, the size of the spare table itself can be optimized with information gathered from the media processor. Specifically, the size of the spare table is determined by the length (i.e. the number of entries) multiplied by the width (i.e. the width of the Physical Address field plus the width of the Length field). This is apparent from FIG. 6. The length is determined by the number of entries in the spare table. By accumulating data from the media processor (e.g. in a manufacturing process), the optimal number of entries in the spare table can be defined. Suppose a manufacturer states a goal of having a specific yield for the media. With the data accumulated by the media processor, the manufacturer can determine the required number of entries to meet that yield goal. Alternately an analysis can be made of the cost of increasing the size of the spare table compared to the yield loss of the media to determine the optimal size of the table to minimize the overall product cost or some other constraining system parameter.

Considering FIG. 6 again, the width of the table consists of the physical address field and the length field. With the data accumulated by the media processor, the optimal value of the length field can be decided based on yield cost metrics such as those described in the previous paragraph.

Consider that manufacturing processes historically improve yields over time and volume. During product manufacture, the media processor can enable a manufacturer to quantify the improvements in the media and reduce the size of the spare table. This can be done, for example, by making the size of the spare table configurable on a per product basis, with the resources (memory used in the spare table) available for other applications. This can improve performance, for example, because of the additional memory freed from the spare table. If the design of the product cannot allow that level of flexibility, the manufacturer can, alternately, choose to redesign the product to reduce the size of the table either when the product is being redesigned for other reasons, or when a cost analysis based on data from the media processor suggests that it would be cost effective to do it.

Another possibility exists for minimizing the table width. The Physical Address field would nominally address each memory unit. For example, if we had a media that had 1024 addressable locations, it would take 10 bits to address each location individually. If all of the errors were burst errors that covered multiple locations, it might be cost effective to reduce the address field width to a smaller number than the actual physical width. Each entry in the table would identify a "block" of memory units which would increase in size directly as the number of address bits were reduced.

To continue the example of a media addressed completely by 10 bits (1024 locations), consider that spares were always relatively large, on average covering 12 bits with the largest allowed being 16 bits. A standard table entry would then require 10 bits for the Physical Address and 4 bits for the length fields. (This assumes that a length field entry of 1 to spare 1 location on up to an entry of 15 to spare 15 locations, while a length entry of 0 spares 16 locations.) Each entry in the spare table requires 14 bits total. By reducing the number of address bits stored in the spare table to 8 bits, 256 "blocks" could be addressed, each consisting of four actual memory locations. The block address is created by dropping the two right most bits in the full address. With this reduced address scheme, the physical address field is reduced to 8 bits and the length field is reduced to a maximum of 3 bits. For an example with the reduced address, if the burst "cooperated" and lined up on the optimum block boundaries, the length field would be 3 blocks and the sparing would be optimal. If a burst error of the same length straddled block boundaries, then an additional block would be have to be spared resulting in some good addressable locations being unnecessarily spared because of the lack of address resolution in the reduced addressed block scheme.

As an example, consider the table below, which describes an optimal sparing example for the reduced address scheme. The second line of the table provides the full address while the third line indicates the corresponding reduced block address. The first line has a "G" for a good addressable location and an "X" for a defective location corresponding to the addresses in the lines below. The fourth line shows the results of sparing blocks with the reduced address corresponding to the addresses listed above. Usable locations are marked with a "U" and spared locations are marked with an "S".

| G | G | G | G | X | X | X | X | X | X | X | X | X | X | X | X | G | G | G |
|---|---|---|---|---|---|---|---|---|---|---|---|---|---|---|---|---|---|---|
| 12 | 13 | 14 | 15 | 16 | 17 | 18 | 19 | 20 | 21 | 22 | 23 | 24 | 25 | 26 | 27 | 28 | 29 | 30 |

-continued

| 3 | 3 | 3 | 3 | 4 | 4 | 4 | 4 | 5 | 5 | 5 | 5 | 6 | 6 | 6 | 6 | 7 | 7 | 7 |
|---|---|---|---|---|---|---|---|---|---|---|---|---|---|---|---|---|---|---|
| U | U | U | U | S | S | S | S | S | S | S | S | S | S | S | S | U | U | U |

In this "optimal" case the locations spared with the reduced address block scheme are exactly the same as what would be spared with the full address scheme with a significant reduction in the width of the spare table.

With the full address scheme a spare table entry would require a first address of burst field width of 10 bits. In this case the first address location of the burst entry would be 16. The burst width field would require 4 bits to accommodate a maximum burst of 16. The entry in the example would be 12, since the example burst is 12 bits in length. The total width for a spare table entry using the full address would be 14 bits.

In the reduced address scheme a spare table entry would require the reduced address of the first block containing a spare location in a field with a width of 8 bits. In this case the entry would be 4, addressing the location of the first block containing an error. The width field, in this example, requires 2 bits to accommodate a 4 block burst, equivalent to a maximum burst of 16 fully addressable locations. However in the non-optimal case where a burst of 16 addressable locations straddles block boundaries, 5 blocks are affected and an extra bit is required in the burst width field. The total width for a spare table entry using the block address would be 11 bits for a savings of 3 bits from the full address scheme.

NonOptimal Example (an "Uncooperative" Burst Location)

Using the same nomenclature as before, the second table illustrates a 12 bit burst that straddles block boundaries resulting in a loss of efficiency in the sparing scheme.

| G | G | G | X | X | X | X | X | X | X | X | X | X | X | X | G | G | G | G | G |
|---|---|---|---|---|---|---|---|---|---|---|---|---|---|---|---|---|---|---|---|
| 11 | 12 | 13 | 14 | 15 | 16 | 17 | 18 | 19 | 20 | 21 | 22 | 23 | 24 | 25 | 26 | 27 | 28 | 29 | 30 |
| 2 | 3 | 3 | 3 | 3 | 4 | 4 | 4 | 4 | 5 | 5 | 5 | 5 | 6 | 6 | 6 | 6 | 7 | 7 | 7 |
| U | S | S | S | S | S | S | S | S | S | S | S | S | S | S | S | S | U | U | U |

For this example the full address spare table entry would have a full address of 14 entered in the 10 bit location field and a 12 entered in the 4 bit burst width field. The reduced block addressing spare table entry has an entry of 3 in its 8 bit location field and an entry of 4 in its 3 bit burst width field. The lack of resolution in the block scheme results in sparing four good addressable locations. These are full address locations 12, 13, 26 and 27.

While the reduced block address scheme can result in some unnecessary spares, in every case, this scheme saves 3 bits from the width of spare table (two from the address and one from the length field). This is yet another case the media processor can consider to optimize the spare table once the data had been collected and analyzed.

Conclusion

In the embodiments described above, a media processor tests individual media for burst errors and optimally configures sparing table entries associated with the media. By optimizing sparing table entries, media yields can be improved.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of providing a sparing table comprising:
   receiving at least one media for storing data;
   processing the at least one media by identifying burst errors having burst error locations;
   determining whether any of the burst errors can be combined for purposes of entry annotation in a sparing table associated with the at least one media; and
   in an event that a burst error can be combined with at least one other burst error, providing an entry in the sparing table that reflects one or more burst error combinations.

2. The method of claim 1, wherein said determining comprises considering one or more parameters associated with the burst errors.

3. The method of claim 1, wherein said determining comprises considering one or more parameters associated with the burst errors, at least one parameter comprising a physical distance between burst error locations.

4. The method of claim 1, wherein said receiving comprises receiving one or more magnetic-based media.

5. The method of claim 1, wherein said receiving comprises receiving one or more optical-based media.

6. The method of claim 1, wherein said receiving comprises receiving one or more semiconductor-based media.

7. A method of providing a sparing table comprising:
   processing one or more media to identify one or more errors associated with the one or more media; and
   configuring a sparing table size to accommodate entries pertaining to the one or more errors.

8. A media processor comprising:
   a defect locator configured to locate burst errors on a particular piece of media for storing data; and
   a sparing table optimizer configured to process burst error locations to determine whether any of the burst errors can be combined for purposes of entry annotation in a sparing table that is associated with the particular piece of media.

9. The media processor of claim 8, wherein the sparing table optimizer is configured to consider physical distances between burst error locations when determining whether any of the burst errors can be combined.

10. The media processor of claim 8, wherein the defect locator is configured to locate burst errors on magnetic-based media.

11. The media processor of claim 8, wherein the defect locator is configured to locate burst errors on optical-based media.

12. The media processor of claim 8, wherein the defect locator is configured to locate burst errors on semiconductor-based media.

13. The media processor of claim 8, wherein the sparing table optimizer is further configured to provide entries in the sparing table that is associated with the particular piece of media.

14. The media processor of claim 8 embodied in a computer.

15. The media processor of claim 8 embodied on a computer-readable media.

16. One or more computer-readable media having executable instructions thereon which, when executed by one or more processors, cause the one or more processors to:

determine whether any burst errors associated with a particular piece of media for storing data can be combined for purposes of entry annotation in a sparing table associated with the media; and in an event that a burst error can be combined with at least one other burst error, provide an entry in the sparing table that reflects one or more burst error combinations.

17. The one or more computer-readable media of claim 16, wherein the instructions cause the one or more processors to consider physical distances between burst error locations to determine whether any of the burst error can be combined.

18. A computer embodying the computer-readable media of claim 16.

19. A sparing table comprising:

an address field for containing data associated with a starting physical address of a media portion that has been spared; and a length field for containing data that defines a length of an address string that has been spared, the length field for a particular physical address entry being capable of containing data that spans multiple burst errors.

20. A computer embodying the sparing table of claim 19.

21. A sparing table optimizer comprising:

means for determining whether any burst errors associated with a particular piece of media for storing data can be combined for purposes of entry annotation in a sparing table associated with the particular piece of media; and means for providing an entry in the sparing table that reflects one or more burst error combinations in an event that a burst error can be combined with at least one other burst error.

* * * * *